United States Patent [19]

Matsuda et al.

[11] Patent Number: 4,893,581
[45] Date of Patent: Jan. 16, 1990

[54] IMAGE FORMING METHOD

[75] Inventors: Hiroshi Matsuda, Yokohama; Toshihiko Miyazaki, Tokyo, both of Japan

[73] Assignee: Canon Kabushiki Kaisha, Tokyo, Japan

[21] Appl. No.: 273,137

[22] Filed: Nov. 14, 1988

Related U.S. Application Data

[63] Continuation of Ser. No. 157,142, Feb. 10, 1988, abandoned, which is a continuation of Ser. No. 812,067, Dec. 23, 1985, abandoned.

[30] Foreign Application Priority Data

Dec. 28, 1984 [JP] Japan .................................. 59-274828
Dec. 28, 1984 [JP] Japan .................................. 59-274829

[51] Int. Cl.$^4$ .............................................. B41M 5/26
[52] U.S. Cl. ..................................... 116/201; 116/207; 430/945; 430/964
[58] Field of Search ............... 116/201, 202, 206, 207, 116/216; 374/106, 161, 162; 430/270, 495, 935, 945, 964; 436/2

[56] References Cited

U.S. PATENT DOCUMENTS

| 3,501,297 | 3/1970 | Cremeans | 430/374 |
| 3,761,942 | 9/1973 | Lorenz et al. | 430/374 |
| 4,189,399 | 2/1980 | Patel | 116/202 |
| 4,195,056 | 3/1980 | Patel | 422/56 |
| 4,389,217 | 6/1983 | Baughman et al. | 436/2 |
| 4,439,346 | 3/1984 | Patel et al. | 252/408.1 |
| 4,439,514 | 3/1984 | Garito | 430/272 |
| 4,562,141 | 12/1985 | Tieke | 430/281 |
| 4,602,263 | 7/1986 | Borror et al. | 430/945 |

FOREIGN PATENT DOCUMENTS 1201243 9/1986 Japan .................................. 430/964

Primary Examiner—William A. Cuchlinski, Jr.
Assistant Examiner—W. Morris Worth
Attorney, Agent, or Firm—Fitzpatrick, Cella, Harper & Scinto

[57] ABSTRACT

A display method is provided which comprises imparting a thermal energy to a display medium prepared by polymerizing a monomolecular film of a diacetylene derivative compound or a built-up film thereof and brought to a first state, so as to change said display medium to a second state within a temperature wherein the reversibility of change between the first state and the second state can be maintained.

9 Claims, 2 Drawing Sheets

IMAGE FORMING METHOD

This application is a continuation of application Ser. No. 157,142 filed Feb. 10, 1988, now abandoned, which is a continuation of application Ser. No. 812,067 filed Dec. 23, 1985, now abandoned.

BACKGROUND OF THE INVENTION

1. Field of the Invention

This invention relates to a display method utilizing the thermally induced color change of a film made of a diacetylene derivative compound.

2. Description of the Related Art

It is hitherto known that films formed by coating and drying a solution of a diacetylene derivative compound on a carrier have the following properties.

(1) The film is colorless in its original state and, when irradiated by ultraviolet rays to cause a certain degree of polymerization, it will transform into a first state of giving a blue color. This first state of blue color is stable and can not return to the original colorless state even after the irradiation of the ultraviolet ray has been discontinued. The change from the original state to the first state caused by a ultraviolet ray is irreversible.

(2) The film in the first state, when heated to about 50° C. by imparting a thermal energy, will transform into a second state of red color. This second state of the film cannot return to the first state of blue color even after the heating is stopped and the film is cooled. The change from the first state to the second state due to a heat is also irreversible.

(3) The film in the second state, when heated further to about 300° C. by imparting a thermal energy will transform into a third state of yellow color. This third state of the film can return to the second state when the heating is stopped and the film has been cooled. Thus the change between second state and third state is reversible.

Extensive researches are being made to develope a fixed display (i.e., a hard copy) by utilizing the irreversible change between the first and the second state and to develop an erasable display (i.e., a soft copy) by utilizing the reversible change between the second state and the third state on the basis of the abovementioned property of the diacetylene derivative films.

In preparation of a soft copy utilizing the thermally induced reversible change between the second state and the third state of a diacetylene derivative film, a large amount of thermal energy is required for display because a high temperature of about 300° C. is required for the change from the second state to the third state. Moreover, with a less intense thermal energy source, a longer time is required for heating the film from normal temperature to a high temperature for the third state, resulting in slow response for display. In order to obtain quick response, a large quantity of thermal energy is required instantaneously.

In preparing both a hard copy and a soft copy using a diacetylene derivative film, the hard copy formed on the film utilizing the irreversible change from the first state to the second state is erased when the film is then used for a soft copy utilizing the reversible change between the second state and the third state, because the soft copy is prepared at a higher temperature than the hard copy. For the same reason, the display medium once used for a soft copy can no longer be used for a hard copy. Accordingly, researches have been made on use of diacetylene derivative films to conduct only either hard copy or a soft copy and virtually no attempt has been made for allowing the films to give both a hard copy and a soft copy.

In preparing a hard copy with a film of diacetylene compound, a means for a soft copy has to be separately prepared for the display to confirm preliminarily the information to be written into the hard copy, which will complicate the procedure and the apparatus. Furthermore, it is often desired to take out the necessary information as a hard copy from the soft copy and for this purpose a hard copy means must be provided separately to take out the displayed information as a hard copy, which will also complicate the procedure and the apparatus.

SUMMARY OF THE INVENTION

An object of the present invention is to provide a method for preparing soft copy utilizing a thermally induced color change of a diacetylene derivative film using a small quantity of thermal energy.

Another object of the present invention is to provide a method for preparing a hard copy or a soft copy utilizing a thermally induced color change of a diacetylene derivative film wherein the information displayed by the hard copy or the soft copy can be confirmed in advance or taken out without separately providing a soft copy or hard copy preparation means.

The present invention has been accomplished based on a finding that the change between a first state and a second state of a diacetylene derivative film can be made reversible as shown in FIG. 1 by using, as said film, a monomolecular film in which molecules are aligned in high order in place of the conventional non-aligned film obtained by coating and drying a diacetylene derivative solution on a substrate. The present invention has its major characteristic in that the polymer film in a first state obtained by polymerizing a monomolecular film of a diacetylene derivative compound is used as a display medium.

According to an aspect of the present invention, there is provided a display method which comprises imparting a thermal energy to a display medium prepared by polymerizing a monomolecular film of a diacetylene derivative compound or a built-up film thereof and brought to a first state, so as to change said display medium to a second state within a range wherein the reversibility of change between the first state and the second state can be maintained.

According to another aspect of the present invention, there is provided a display method which comprises imparting a thermal energy to a display medium obtained by polymerizing a monomolecular film of a diacetylene derivative compound or a built-up film thereof and brought to a blue state, so as to change said display medium to a red state within a temperature range of 30° to 120° C. wherein the reversibility of change between the blue state and the red state can be maintained.

According to a further aspect of the present invention, there is provided a display method which comprises imparting a thermal energy to a display medium prepared by polymerizing a monomolecular film of a diacetylene derivative compound or a built-up film thereof and brought to first state, so as to change said display medium to its second state within a range wherein reversibility of change between the first state and the second state can be maintained or to change said display medium above said range.

According to a still further aspect of the present invention, there is provided a display medium prepared by polymerizing a monomolecular film of a diacetylene derivative compound or a built-up film thereof, and brought to a first state, and changing said display medium to its red state within a temperature range of 30° to 120° C. wherein reversibility of change between blue state and red state can be maintained or changing said display medium above said range.

DETAILED DESCRIPTION OF THE PREFERRED EMBODIMENTS

Figure 1:
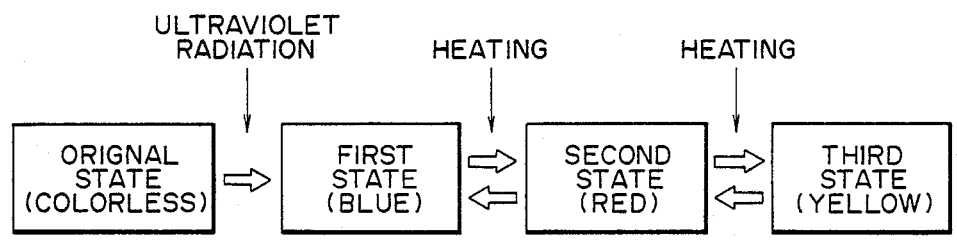
FIG. 1 is a drawing illustrating the basic principle of the present invention.

The diacetylene derivative used in the present invention has a molecular structure comprising, from the necessity of preparing a monomolecular film, one or more hydrophilic portions, one or more hydrophobic portions and one or more diacetylene portions. The diacetylene derivative is represented by, for example, the following general formula

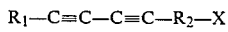

wherein X is a hydrophilic portion, $R_1$ and $R_2$ each are a hydrophobic portion and $C\equiv C-C\equiv C$ is a diacetylene portion. As the hydrophilic portion, there can be mentioned, for example, polar groups such as a carboxyl group, a hydroxyl group, an amino group, a nitrile group, a thioalcohol group, an imino group, a sulfonic acid group and derivatives thereof, a sulfinic acid group and the derivatives thereof as well as their salts. A typical example is a carboxyl group. As the hydrophobic portion, there can be mentioned, for example, straight chain or branched chain alkyl groups, olefinic hydrocarbon groups (e.g. vinyl, vinylidene, ethynyl), phenyl group, polycondensed polycyclic aromatic groups (e.g. naphthyl, anthranyl), chain polycyclic phenyl groups (e.g. biphenyl, terphenyl), alkylene groups, alkenylene groups, etc. Typical examples are long chain alkyl groups. When there is used a diacetylene derivative of the above general formula having a long chain alkyl groups as a hydrophobic portion the total sum of the carbon atoms of the long chain alkyl groups ($R_1$ and $R_2$) is preferably from 10 to 30, particularly 18 or above because of ease of obtaining a monomolecular film.

A monomolecular film can be obtained according to the principle of the Langmuir-Blodgette method using a diacetylene derivative as mentioned above. That is, a diacetylene derivative is dissolved in a solvent such as chloroform, benzene or the like; the resulting solution is dropped on the surface of water; the solution spreads quickly on the water surface; the solvent in the solution vaporizes; as a result, there remains on the water surface a monomolecular film of the diacetylene derivative wherein the molecule is arranged two-dimensionally in such a particular orientation that the hydrophilic portion is directed toward the aqueous phase and the hydrophobic portions are apart from the aqueous phase; then, the surface density of the monomolecular film is increased; thereby, the monomolecular film can be transferred onto a supporting carrier. The monomolecular film can also be obtained as a built-up film by repeating said transfer onto a carrier a plurality of times.

In transfer of the monomolecular film of a diacetylene derivative, depending upon the method of transfer or the type of carrier, the hydrophilic portion will be directed toward a carrier or the hydrophobic portion will be directed toward the carrier. Either will be useful in the present invention. In obtaining the monomolecular film in a built-up form, there are obtained, depending upon the method of transfer or the type of carrier, an X type film wherein all the hydrophobic portions of each monomolecular layer are directed toward a carrier, a Y type film wherein the hydrophilic portions and the hydrophobic portions confront with each other between the adjacent layers, and a Z type film wherein all the hydrophilic portions are directed toward the carrier. Any film can be used in the present invention.

Any of a monomolecular film and a built-up film can be used in the present invention. However, a built-up film consisting of at least 5 monomolecular layers is preferred for obtaining a distinct color change giving a well-defined display.

The polymerization for converting the monomolecular film of a diacetylene derivative from the original state to a first state can be conducted by irradiation of ultraviolet rays to the film. This polymerization using ultraviolet rays is preferably conducted uniformly so as to produce a sufficiently blue color. An insufficient degree of the polymerization causes an indistinct color change and unclear display. An excessive degree of the polymerization causes a change to a second state of red color in one step via the first state. In this case, the reversible change by heat between first state and second state can not be utilized because the one-step change from the original state to the second state caused by excessive polymerization is irreversible. In polymerization by ultraviolet rays, the polymerization degree is preferred to be generally about 35 to 40% but this is only a rough criterion because a preferred polymerization degree varies depending upon the type of diacetylene derivative used, etc.

The change of a diacetylene derivative film by polymerization from the colorless original state to a first state of blue color is irreversible as shown in FIG. 1. Therefore, the first state is maintained even after application of ultraviolet rays has been discontinued. A monomolecular film of a diacetylene derivative in this first state is used as a display medium in the present invention.

Display using the above display medium is usually conducted by imparting a thermal energy to the display medium to change it to a second state. For imparting the thermal energy, there can be used, for example, heat generation of an electric heating resistor provided adjacent to the display medium or irradiation of ultraviolet laser beams. The display medium of the first state, when a thermal energy is imparted thereto to elevate the temperature of the medium, is changed to a second state giving a red color as shown in FIG. 1. Thus the display can be made by the color contrast between the display medium in the red second state which has received thermal energy and the display medium in the blue first state which has not received thermal energy.

When the change from the first state to the second state is made within a temperature range wherein the reversible change between these two states can be maintained, the display medium which has changed to the second state will return to the first state upon discontinuation of the supply of a thermal energy and subsequent temperature fall of the display medium, and as a result display will be erased. Hence, display utilizing the change from the first state to the second state made within said temperature range can be employed for soft copies.

The change from the first state to the second state which can be used for a soft copy is usually conducted at a temperature of from about 30° C. to about 120° C., preferably about 30° C. to about 100° C. depending on the type of diacetylene derivative, etc. An insufficient temperature elevation will give an insufficient color change and indistinct display. Excessive temperature elevation will prevent the display medium returning from the second state to the first state on stopping the thermal energy supply and cooling, whereby erasing of the display cannot be practiced.

If the change from the first state to the second state is effected by exceeding a temparature range permitting the reversible change between these two states, the display medium in the second state cannot return to the first state and stays at the second state even when the supply of a thermal energy is discontinued and the display medium is cooled, and as a result display is left unerased. Hence, display utilizing the change from the first state to the second state made beyond said temperature range can be used for hard copies. When the change from the first state to the second state useful for hard copy is conducted at an high temperature of 250° to 300° C. or above, the display medium reaches a third state of yellow color via the second state, as shown in FIG. 1. The change between second state and third state at high temperatures is reversible and the display medium of third state will change to the second state when the temperature of the display medium lowers but cannot return to the first state. Hence, in utilizing the change from the first state to the second state for hard copies a thermal energy is imparted to the display medium of a first state to change it to a third state; upon cooling of the display medium, the portions of the display medium having received the thermal energy give a red color of the second state; as a result, there is formed a contrast between this red color and the blue color of the portions of the display medium which have not received the thermal energy and are in the first state, whereby display (hard copy) can be conducted. A selection can be made either automatically according to a prescribed condition or manually as to whether the energy is to be supplied within the temperature range to keep the change reversible or beyond the temperature range, namely the selection of soft copy or hard copy.

The method of the present invention may be employed for soft copies by utilizing the reversible change between first state and second state. When the information displayed by a soft copy is required to be taken out as a hard copy, a thermal energy for causing display is increased and the display medium is heated beyond a temperature range wherein the reversible change between first state and second state can be maintained, whereby the information displayed in the form of a soft copy within said temperature is converted to a hard copy.

When the method of the present invention is applied to preparation of a hard copy, at first the information to be recorded in the hard copy can be confirmed beforehand by using a soft copy utilizing the reversible change between a first state and a second state. Then, a thermal energy supply is intensified to heat the display medium above a temperature range of the reversible change between first state and second state, whereby the very information confirmed as above is recorded on the same display medium in a form of a hard copy. The display medium to be used later for a hard copy may be employed as a soft copy for confirming the information, where no adverse effect is encountered in the hard copy since a reversible lower temperature region is adopted for the soft copy display than for the hard copy.

EXAMPLE 1

Apparatus for formation of monomolecular film

The apparatus used for obtaining a monomolecular film of a diacetylene derivative compound will be explained by referring to FIGS. 2 and 3. In the figures, 1 is a liquid bath containing an aqueous phase. Inside the liquid bath is horizontally suspended a polypropylene frame 2 as a two-dimensional cylinder, whereby the water surface is partitioned.

Inside the frame 2 floats a polypropylene float 4 functioning as a two-dimensional piston. The float 4 has a length slightly smaller than the inside width of the frame 2 so as to move smoothly to the right or to the left in the figures as a two-dimensional piston.

The movement of the float 4 to the right is conducted by a weight 6 which pulls the float 4 to the right via a pulley 5. The movement to the left and the stopping of the float 4 is conducted by a repulsive force between a magnet 7 provided on the float 4 and a counter magnet 8 (not shown) capable of moving to the right or to the left according to a holding mechanism (not shown).

At the right and left of the liquid bath 1 are provided suction nozzles 9 for sucking the liquid surface 3 inside the frame 2 and for cleaning the water surface 3. These suction nozzles 9 are connected to a suction pump (not shown) via suction pipes 10.

Above the water surface 3 at the right is provided an arm 12 for holding a carrier 11 and capable of moving vertically. Owing to the vertical movement of this arm 12, the carrier 11 can be lowered vertically so as to cross the water surface 3.

Production of display element

Figure 4:
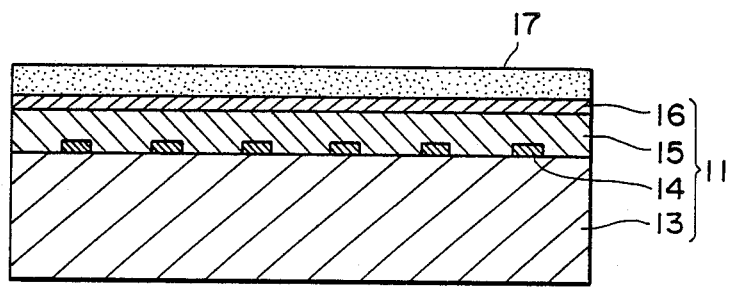
FIG. 4 is a vertical sectional view of the display device produced in Examples 1 and 2.

An indium-tin oxide (ITO) film having a thickness of 2,000 Å was formed by sputtering on the surface of a sufficiently clean glass substrate 13 shown in FIG. 4. A photoresist was then coated on the ITO film and a wiring pattern in a stripe shape (16 lines/mm) was formed by baking. Thereafter, an etching treatment was conducted to remove the unnecessary portions of the ITO film and the remaining portions of the ITO film was used as a lower electrode layer 14.

Thereon was laminated a 1,000 Å-thick tantalum nitride film by sputtering. Through the similar treatment process, a dot pattern in grid shape (40 $\mu$m × 40 $\mu$m, 16 lines/mm in longitudinal and crosswise directions) was formed on the lower electrode layer 14 and used as a heat-generating layer 15.

In the same manner as mentioned above, an ITO film was formed on the heat-generating layer 15. A photoresist was coated on the ITO film and a wiring pattern in stripe shape (16 lines/mm) was formed by baking so as to intersect at right angles with the lower electrode layer 14 and to be on the heat-generating layer 15 of dot pattern. An etching treatment was conducted to obtain an upper electrode layer 16.

Figure 2:
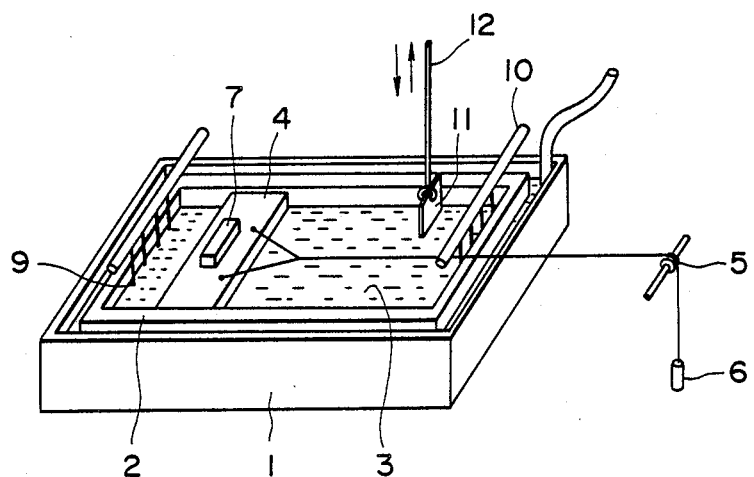
FIG. 2 is a perspective view of the apparatus for formation of a monomolecular film, used in the Examples.
Figure 3:
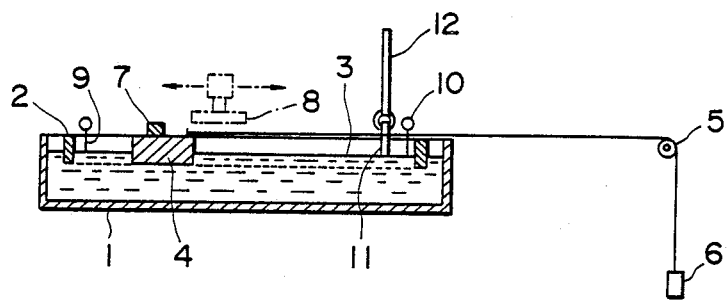
FIG. 3 is a vertical sectional view of the apparatus of FIG. 2.

Using the resulting laminate comprising the glass substrate 13, the lower electrode layer 14, the heat-generating layer 15 and the upper electrode layer 16 as a carrier 11 shown in FIGS. 2 and 3 and also using the apparatus shown in FIGS. 2 and 3, the Langmuir-Blodgette method was conducted.

A diacetylene derivative compound represented by the following formula (1) was dissolved in chloroform in an concentration of $5 \times 10^{-3}$ mole/l.

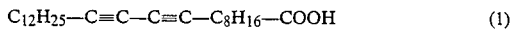

$$C_{12}H_{25}-C\equiv C-C\equiv C-C_8H_{16}-COOH \qquad (1)$$

The resulting solution was dropped and spread on the water surface 3 of an aqueous phase at 20° C. obtained by adjusting a distilled water containing cadmium chloride in a concentration of $1 \times 10^{-3}$ mole/l to pH 6.3 with sodium hydrogencarbonate.

After the solvent (chloroform) had vaporized, the float 4 was moved to decrease the spreading area of the monomolecular film left on the water surface 3 and to increase its surface pressure up to 20 dyn/cm. While the surface tension was kept constant, the carrier 11 was allowed to make a vertical movement gently at a speed of 10 mm/min to transfer the monomolecular film onto the surface (on the side of the upper electrode layer 16) of the carrier 11. The monomolecular film layers formed by the transfer include 6 kinds of 1,5,11,21,31 and 41 layers. Ultraviolet rays of 254 nm were irradiated to each monomolecular film at 1 mW/cm² for 1 minute to change to a first state, whereby each display medium layer 17 was obtained. All the display medium layers 17 had a blue color although the color was deeper in films comprising more built-up layers.

Practice of display

An electric current was allowed to flow between the lower and upper electrode layers 14 and 16 arranged in a matrix shape, in accordance with various pattern instructions to allow the heat-generating layer 15 to heat the display medium layer 17. The heated portions of the display medium layer 17 turned from blue to red and various patterns were displayed by the blue and red colors. When the electricity was cut, the red color returned to the blue color quickly and no afterimage existed. No change in display performance was observed in repeated display. The color change between blue and red was reversible within a temperature range of 34° C. and 62° C.

After display according to various pattern instructions within the above temperature range, the display medium layer 17 was heated up to 70° C. according to a pattern instruction particularly selected. The resulting display of blue and red colors remained as it was even after the electricity had been cut and the temperature of the display medium layer 17 had returned to room temperature. The red portions of the display medium layer 17 were then heated further to 250° C., whereby the portions turned yellow. When the electricity was cut, the yellow color quickly returned to the original red color but, upon further standing, the red color exhibited no change.

EXAMPLE 2

Apparatus for formation of monomolecular film

The same apparatus as in Example 1 was used.
Production of display element

The production was made in the same manner as in Example 1 except that a diacetylene derivative represented by the following formula (2) was used.

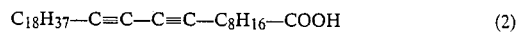

$$C_{18}H_{37}-C\equiv C-C\equiv C-C_8H_{16}-COOH \qquad (2)$$

The condition of the display medium layer 17 obtained was same as that of Example 1.

Practice of display

Display was conducted in the same manner as in Example 1 and a similar result was obtained. The display medium layer 17 changed from the blue color to a red color within a temperature range of 40° to 80° C. and, upon cooling, returned to the blue color. However, when the layer 17 was heated to exceed 80° C. and then cooled, return from the red color to blue color occurred with difficulty. When heated to 250° C. or above, there occured a change to a yellow color.

EXAMPLE 3

Apparatus for formation of monomolecular film

The same apparatus as in Example 1 was used.
Production of display element

A diacetylene derivative represented by the following formula (3) was used.

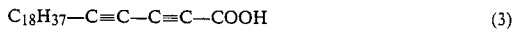

$$C_{18}H_{37}-C\equiv C-C\equiv C-COOH \qquad (3)$$

The aqueous phase contains only distilled water without any additive.

Figure 5:
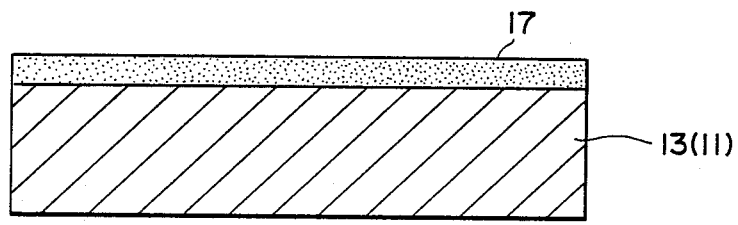
FIG. 5 is a vertical sectional view of the display device produced in Example 3.

As shown in FIG. 5, glass substrate 13 was used as a carrier 11 as shown in FIGS. 2 and 3. The monomolecular film of the above diacetylene derivative was transfered onto the surface of the carrier 11 in the same manner as in Example 1 and then exposed to ultraviolet rays to obtain a display medium layer 17. The condition of the display medium layer 17 was the same as that of Example 1.

Practice of display

Argon laser beams (output: 30 mW, wavelength: 488 nm) were applied to the display medium layer 17 and a similar result as in Example 1 was obtained. The display medium layer 17 changed from the blue color to a red color when heated to a temperature between 60° to 85° C. and returned to the blue color upon cooling. However, when the layer 17 was heated above 85° C. and then cooled, return from the red color to the blue color occurred with difficulty. When heated to 250° C. or above, there occured a change to a yellow color.

According to the display method of the present invention, in a soft copy, the information displayed by the soft copy can be taken out, as necessary, in the form of a hard copy simply by increasing a thermal energy for causing display. In hard copy, the information to be displayed in hard copy can be confirmed beforehand simply by limiting the thermal energy for causing display and conducting soft copy. Therefore, 'as necessary' taking-out of the information disclosed or prior confirmation of the information to be displayed is possible without separately providing a hard copy means in preparation of a soft copy or a soft copy means in preparation of a hard copy, so that the procedure and apparatus can be simplified.

What is claimed is:

1. An image-forming method comprising imparting thermal energy to a medium in a first state to thereby change said medium to either a second state or a third state, wherein said change from said first state to said second state is reversible, said change from said first state to said third state is irreversible, and said medium in said third state is capable of being reversibly changed to said second state; said medium in a first state being a polymerized Langmuir-Blodgette monomolecular film or built-up monomolecular film of a diacetylene derivative compound represented by the formula $$R_1-C\equiv C-C\equiv C-R_2-X$$

wherein X is selected from the group consisting of carboxyl groups, hydroxyl groups, amino groups, nitrile groups, thioalcohol groups, imino groups, sulfonic acid groups, derivatives of sulfonic acid groups, salts of sulfonic acid groups, sulfinic acid groups, derivatives of sulfinic acid groups, and salts of sulfinic acid groups; $R_1$ and $R_2$ are each selected from the group consisting of alkyl groups, olefinic hydrocarbon groups, aryl groups, alkylene groups, and alkenylene groups.

2. An image-forming method according to claim 1, wherein the imparting of thermal energy is by heating the medium to a temperature of 250° C. or more.

3. An image-forming method according to claim 1, wherein the imparting of thermal energy is by heating the medium to 30° to 120° C. to thereby change said medium from the first state to the second state.

4. An image-forming method according to claim 1, wherein the imparting of thermal energy is by heating the medium to 30° to 100° C. to thereby change said medium from the first state to the second state.

5. An image-forming method according to claim 1, wherein said first state is blue, the second state is red and the third state is yellow.

6. An image-forming method comprising imparting thermal energy to an image-forming medium in a first state to thereby change said medium to a second state; wherein said change from said first state to said second state is reversible, said medium in a first state being a polymerized Langmuir-Blodgette monomolecular film or built-up monomolecular films of a diacetylene derivative compound represented by the formula $$R_1-C\equiv C-C\equiv C-R_2-X$$

wherein X is selected from the group consisting of carboxyl groups, hydroxyl groups, amino groups, nitrile groups, thioalcohol groups, imino groups, sulfonic acid groups, derivatives of sulfonic acid groups, salts of sulfonic acid groups, sulfinic acid groups, derivatives of sulfinic acid groups, and salts of sulfinic acid groups; $R_1$ and $R_2$ are each selected from the group consisting of alkyl groups, olefinic hydrocarbon groups, aryl groups, alkylene groups, and alkenylene groups.

7. An image-forming method according to claim 6, wherein the imparting of thermal energy is by heating the medium to 30° to 120° C. to thereby change said medium from the first state to the second state.

8. An image-forming method according to claim 6, wherein the imparting of thermal energy is by heating the medium to 30° to 100° C. to thereby change said medium from the first state to the second state.

9. An image-forming method according to claim 6, wherein said first state is blue and said second state is red.

* * * * *

UNITED STATES PATENT AND TRADEMARK OFFICE
CERTIFICATE OF CORRECTION

PATENT NO. : 4,893,581
DATED : January 16, 1990
INVENTOR(S) : HIROSHI MATSUDA, ET AL.

It is certified that error appears in the above-identified patent and that said Letters Patent is hereby corrected as shown below:

On the title page:

IN [56] REFERENCES CITED

FOREIGN PATENT DOCUMENTS, "1201243" should read --61-201243--.

SHEET 1 OF 2

FIG. 1, "ORIGNAL" should read --ORIGINAL--.

COLUMN 1

Line 25, "a" should read --an--.
Line 40, "develope" should read --develop--.
Line 45, "abovementioned" should read --above-mentioned--.

COLUMN 3

Line 61, "Langmuir-Blodgette" should read --Langmuir-Blodgett--.

COLUMN 5

Line 27, "temparature" should read --temperature--.
Line 37, "an" should read --a--.

COLUMN 7

Line 11, "gette" should read --gett--.
Line 14, "an" should read --a--.

UNITED STATES PATENT AND TRADEMARK OFFICE
CERTIFICATE OF CORRECTION

PATENT NO. : 4,893,581
DATED : January 16, 1990
INVENTOR(S) : HIROSHI MATSUDA, ET AL.

Page 2 of 2

It is certified that error appears in the above-identified patent and that said Letters Patent is hereby corrected as shown below:

COLUMN 8

Line 20, "occured" should read --occurred--.
    Line 51, "occured" should read --occurred--.

COLUMN 9

Line 7, "Langmuir-Blodgette" should read
        --Langmuir-Blodgett--.

COLUMN 10

Line 9, "Langmuir-Blodgette" should read
        --Langmuir-Blodgett--.

Signed and Sealed this

Thirty-first Day of March, 1992

Attest:

HARRY F. MANBECK, JR.

Attesting Officer      Commissioner of Patents and Trademarks